United States Patent [19]

Hawkins

[11] Patent Number: 4,552,181
[45] Date of Patent: Nov. 12, 1985

[54] HIGH SPEED DUMP VALVE FOR FIRE FIGHTING APPARATUS

[76] Inventor: Bruce Hawkins, Route 1, Box 345, Kenai, Ak. 99611

[21] Appl. No.: 681,955

[22] Filed: Dec. 14, 1984

[51] Int. Cl.⁴ .......................... F16K 11/22; F16K 3/04
[52] U.S. Cl. ..................................... 137/875; 137/615; 137/625.44; 137/637.1; 137/861; 137/883; 137/899; 251/118; 251/298
[58] Field of Search ................ 137/625.44, 637.1, 861, 137/875, 883, 872, 899, 615; 251/118, 298, 302

[56] References Cited

U.S. PATENT DOCUMENTS

| | | | |
|---|---|---|---|
| 1,405,900 | 2/1922 | Cassalette | 137/875 |
| 2,748,800 | 6/1956 | Allen | 137/625.44 X |
| 3,331,394 | 7/1967 | Hefler et al. | 137/875 |
| 3,521,659 | 7/1970 | Seger | 137/625.44 X |
| 3,871,614 | 3/1975 | Hughes et al. | 137/875 X |
| 4,190,082 | 2/1980 | Crespo | 137/872 X |
| 4,270,572 | 6/1981 | Jazynha | 137/615 |
| 4,310,020 | 1/1982 | Jerperson et al. | 137/563 |
| 4,354,528 | 10/1982 | McAndrew | 137/625.44 X |

FOREIGN PATENT DOCUMENTS 241078 11/1911 Austria ................................ 137/875

Primary Examiner—A. Michael Chambers
Assistant Examiner—John C. Fox
Attorney, Agent, or Firm—Michael J. Tavella

[57] ABSTRACT

A directional dump valve is disclosed which allows for the rapid dumping of water from a standard tank truck or similar vehicle. The device has three main dumping ports, which are quickly selected by adjusting the position of the water control doors. This adjustment can be made quickly with the handles provided on the device. A quick action locking device is disclosed which will lock the handles into position once the proper port has been selected. Two of the outlets are fitted with conduits to channel water from the rear of the vehicle laterally past the ends of the truck. Baffles are provided on the control doors to reduce turbulence in the valve, and to help quicken the flow through the side discharge conduits. The conduits can also be extended by the use of extensions, which can be folded up on top of the conduits when they are not needed. The valve is designed to be flange mounted to the tank truck and can be disassembled for quick repair.

2 Claims, 5 Drawing Figures

HIGH SPEED DUMP VALVE FOR FIRE FIGHTING APPARATUS

BACKGROUND OF THE INVENTION

This invention is related to dump valves for fire fighting apparatus.

In many rural areas of the country, there is no established fire main system with fire hydrants, as is common in urban areas. To fight large fires in these rural areas, a reservoir system must be established near the fire site. Water is then transferred from a local lake or other large body or water, usually by tank truck, to the temporary site. In the case of a large fire, several thousand gallons must be transferred per hour. Therefore, there is a need to move this water from the vehicle to the temporary reservoir as quickly as possible. The present invention accomplishes this objective.

BRIEF DESCRIPTION OF THE INVENTION

The invention consists of a central valve section that is flange mounted to a tank truck. The valve section has two outlet conduits that allow water to exit at both ends. A third outlet is provided, as part of the valve section, to allow water to dump straight back from the vehicle. The valve section consists of an overall frame structure that has a system of doors which direct the flow of water from the main truck water outlet valve to the appropriate outlet conduit as needed. This system dispenses with the need to position the entire truck to fill the temporary reservoir. With the device, the water can be deposited on either side of the vehicle or straight out the back.

A system of locks is also provided to allow the valve control handles, used to position the doors, to be set quickly and then immediately locked into place. This allows for rapid dumping of water in any direction needed. The entire device is designed to be mounted on the back of a standard tank truck.

It is an object of this invention to provide a quick means of dumping water from a storage vehicle to a reservoir site.

It is another object of this device to provide means to dump water from either side of the vehicle, or straight out of the back of the vehicle.

It is another object of this invention to provide a quick means of setting the desired direction of dumping.

Another object of this invention is to provide a positive and quick means of locking the position of various parts to ensure proper dumping of water in the correct direction.

DESCRIPTION OF THE PREFERRED EMBODIMENT

Figure 1:
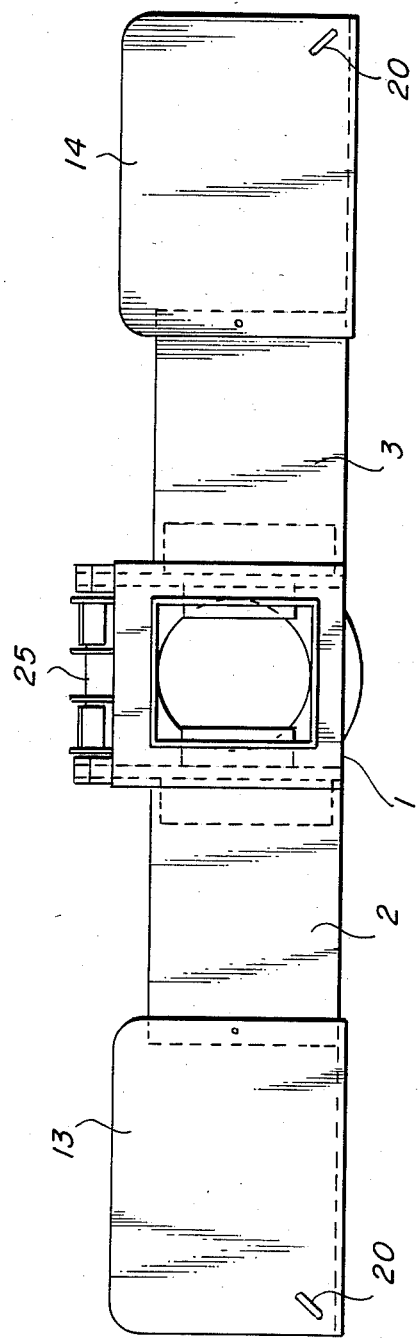
FIG. 1 is an elevation view of the device.
Figure 2:
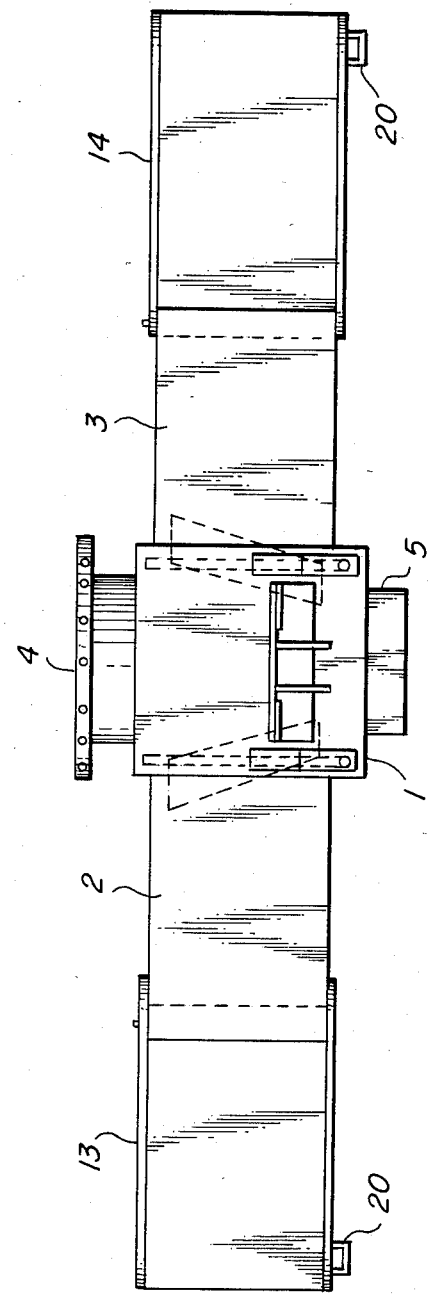
FIG. 2 is a plan view of the device.
Figure 3:
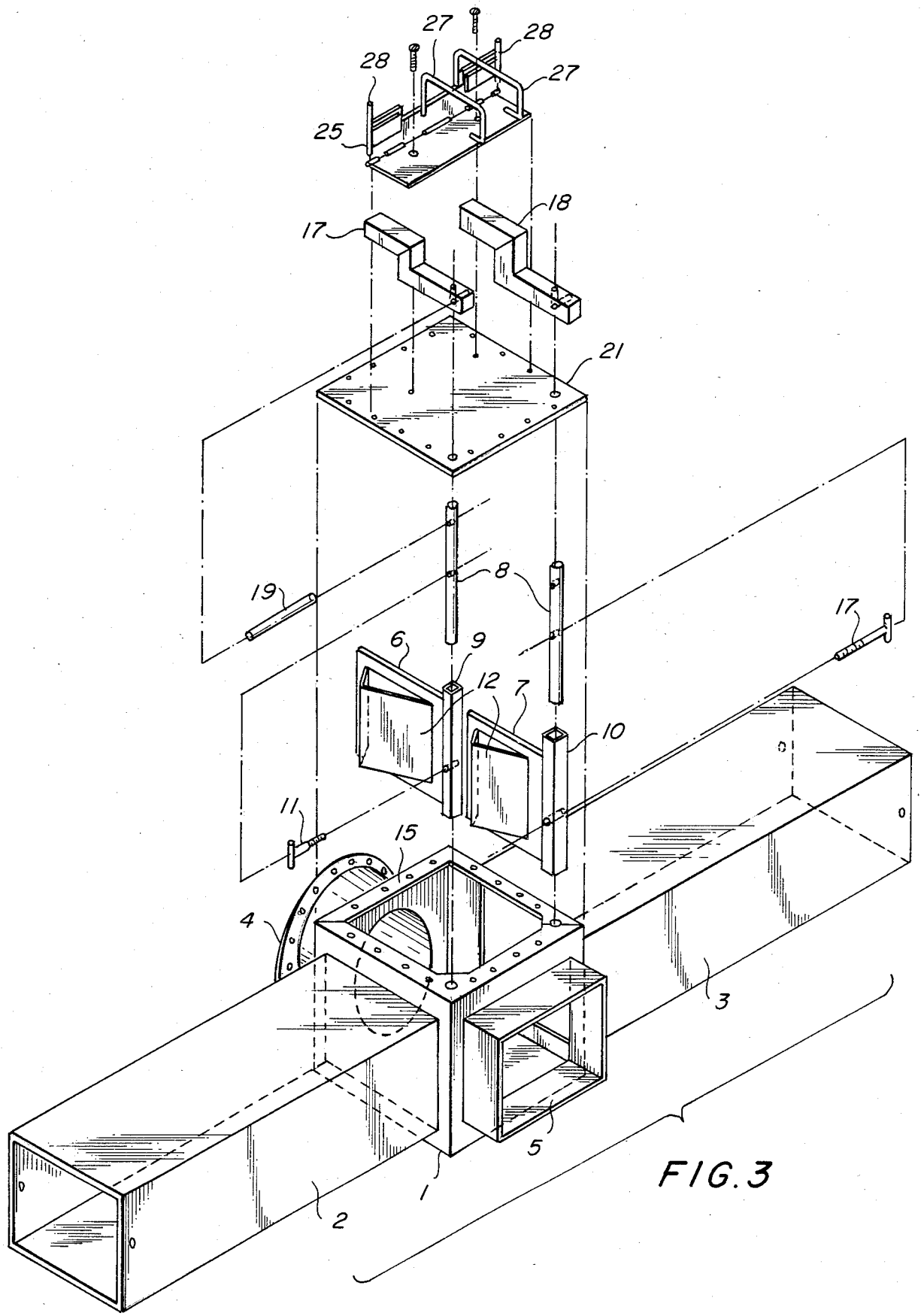
FIG. 3 is an exploded isometric view of the device, showing the placement of internal parts.

Referring now to the drawing figures, and more particularly to FIGS. 1, 2 and 3, the device consists of a main control valve portion 1. The main control valve portion 1 is a box like structure having an inlet port and three outlet ports. Two of the outlet ports are connected to outlet conduits 2 and 3 such that the conduits are mounted in the same plane and in opposite displacement. The third port is located opposite to the flange port. This port is fitted with an outlet hood 5 and is used when dumping water directly out the rear of the vehicle. The fourth port is located at the rear of the control valve portion 1 and is purperdicular to the conduit portions 2 and 3. A standard flange 4 is connected to this port to allow connection to the outlet flange of a standard tanker truck.

The conduit pieces are made of welded aluminium. The dimensions of the conduits 2 and 3 are adjustable as needed depending on the size of the outlet flange of the tank truck. For a nominal 10 inch outlet flange, the conduits should be approximately 10 inches square. The conduit pieces 2 and 3 are connected to the main control valve portion 1 by welding or other means common to the art.

Figure 4:
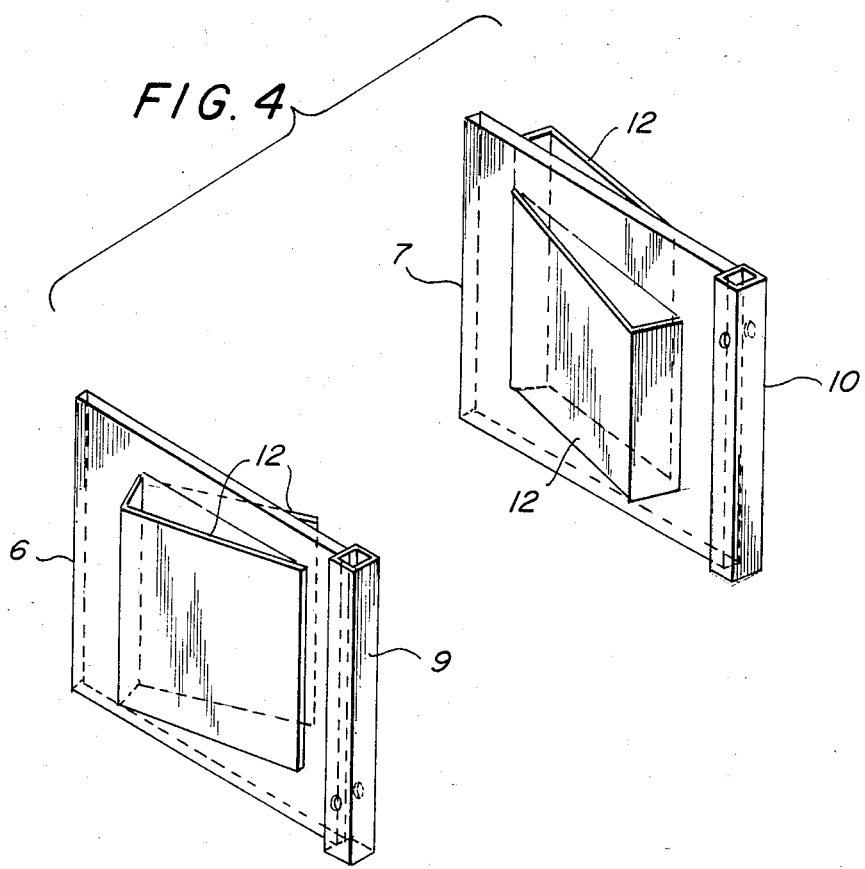
FIG. 4 is a detail view of the door assembly.

Referring now to FIGS. 3 and 4 the main control valve portion 1 is controlled by two doors 6 and 7. The doors are mounted by hinge pins 8, which are positioned inside the hinges 9 and 10. The doors are first placed inside the valve portion 1. The hinge pins 8 are then placed through the top of the valve portion 15 and are set in place inside the hinges 9 and 10. As shown in the drawings, the hinges are placed at the end of the doors, with the doors being exactly centered. This gives the doors a full range of travel and ensures tight seals when the doors are positioned.

The bottom of the valve portion 1 is totally sealed, and the hinge pins 8 are designed to rest on the bottom surface of the valve body. This construction will prevent leakage through the bottom of the device. It is very difficult in practice to avoid this leakage without sealing the bottom of the invention.

The hinge pins 8 are held in place within the hinges by bolts 11 or by other common fastner means known in the art. The bolts 11 pass through both the hinge 9 (or 10) and the hinge pin 8. The bolts are used in the preferred embodiment to allow for removal of the doors for maintenance.

The valve portion 1 is sealed with a top plate 21 which is bolted to the top flange 15. A gasket (not shown) is provided to seal the connection. The gasket means are designed to seal the hinge pin openings, without restricting the movement of the doors. The hinge pins 8 are designed to pass through the top plate 21 and attach to the valve handles 17 and 18. These handles will be discussed in more detail below.

The doors 6 and 7 are located so as to allow for the rapid choice of exit port. Normally, the doors 6 and 7 are mounted as shown in FIG. 2, so that both conduit portions 2 and 3 are sealed. This allows the water to be dumped out the rear of the vehicle. If water were needed out the right port, door 7 would be rotated to the left so that the front port is sealed. To dump water out of the left port, door 6 would be rotated instead of door 7.

Angled baffles 12, are mounted on the doors 6 and 7 to reduce the turbulence in the right angles of the doors which allows for faster dumping of the water. The baffles 12 are made of aluminum and are welded or rivited to the doors 6 and 7. The baffles 12 are positioned as shown in FIG. 4. A rubber seal (not shown) is also provided around the outlet openings of the central valve portion 1 and on both doors 6 and 7.

Extension portions 13 and 14 are also provided, although they are not necessary to proper operation, they do assist in directing the flow of water past the ends of the truck, which permits quicker placement of the truck with respect to the reservoir. The extension portions 13 and 14 are pivotably mounted to the outlet conduits 2 and 3 by rivets or bolts. They are designed to rotate up and rest on top of the outlet conduits when not in use. Handles 20 are provided on both extensions to allow rapid deployment of the extensions. When stored, the extensions do not block the ends of the outlet conduits 2 and 3. Thus, if the extensions are not deployed, water can still be dumped through the conduits.

Figure 5:
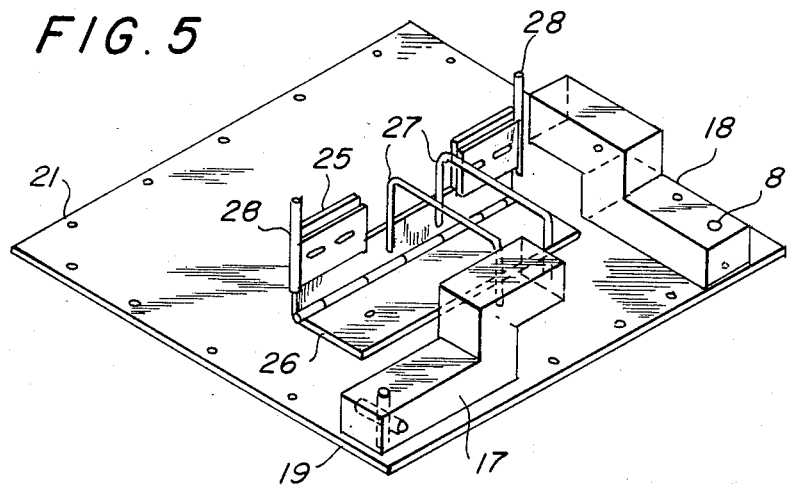
FIG. 5 is a detail view of the handle assembly with the locking device.

Referring now to FIG. 5, the valve operation is determined by the positioning of the control doors 6 and 7. These doors are controlled by two handles 17 and 18. The handles are standard in the art and are similar to those commonly found on ball type valves. The handles are mounted on the hinge pins 8, which protrude through the top side of the cover plate 21. The handles are secured to the hinge pins 8 by roll pin means 19, or by other similar fasteners commonly found in the art.

The valve handle locking assembly 25 is fastened to the top plate 21 as shown. In the preferred embodiment, this assembly is bolted to the top plate because the standard construction of the device uses aluminum, and the locking assembly is made of stainless steel. This combination is impossible to weld and, therefore, bolts or screws are more practical. The handle locking assembly 25, consists of a hinge piece 26 (one portion of which are secured to the top plate); locking bars 27, which are welded to the hinge 26; and support posts 28, which are also welded to the hinge 26. In practice, the locking bars 27 are lifted by rotating the hinge until it is resting flat against the top plate 21. The handles 17 and 18 are then free to rotate to the desired position, after which, the locking bars 27 are returned to their normal locking position (as shown). The locking bars 27 prevent the rotation of the handle (17 in the figure) inward, while the top of the hinge 26 prevents the other handle (18) from rotating outward. The support posts 28 provide additional height, which reduces the tendancy for the handle to be forced over the top of the hinge 26. They also provide a rounded contact surface for the handles. In the case of dumping straight back (through the rear outlet) both handles would be placed as shown in FIG. 2. In this case, the hinge 26 would act as the lock for both handles. It should be obvious from FIG. 5 that the handle positions can be reversed to allow dumping from the other side of the truck.

The device is used by bolting the main flange 4 to the back of a tank truck. Once the truck is at the site, the direction of flow is selected by rotating the handles to set the doors. For dumping out of the left side (through conduit 2), door 6 is rotated until it is blocking the rear outlet port. Both handles are then locked in place. Water is then dumped by opening the main valve on the truck. If additional control is desired, the extension 13 can be lowered into place at the end of conduit 2. To dump water through the right side conduit (no. 3), door 6 is returned to its original position and door 7 is rotated to block the rear outlet port. Then the handles are locked, and the main valve is opened. As before, if additional directional control is needed, extension 14 can be lowered into position. Finally, to dump water straight out the back of the device, both doors are returned to the position as shown in FIG. 2 and the handles are locked into place. Then the main truck valve is opened to dump the water.

The major components of the device are made from aluminum. The hinge pins and the locking latch are stainless steel.

It is intended that the present disclosure should not be construed in any limited sense other than that limited by the scope of the following claims having regard to the teachings herein and the prior art being apparent with the preferred form of the invention disclosed herein and which reveals detail of structure of a preferred form necessary for a better understanding of the invention and may be subject to modification by skilled persons within the scope of the invention without departing from the concept thereof.

What I claim is:

1. A fast action fire dump valve for use on tank trucks having an outlet valve comprising:

A. A directional valve portion having an inlet port, a first outlet port located opposite to said inlet port, a second outlet port located purpendicularly to said inlet and outlet ports and a third outlet port being purpendicularly disposed to said inlet and first outlet ports and opposite to said second outlet port, said valve portion forming a generally square configuration;

B. A flange, having bolt holes, fixedly attached to said valve portion at said inlet port, the flange is used to connect said valve portion to the outlet valve of said tank truck;

C. A first door, having hinge means, rotatably attached to said valve portion by said hinge means, being disposed within said valve portion, said first door being positioned so that the door can close off said first outlet port or said second outlet port, depending on its position which is manually controllable;

D. A second door, also having hinge means and also being rotatably attached to said valve portion by said hinge means and also being disposed within said valve portion, said second door being positioned so that it can close off either the first outlet port or the third outlet port, depending on its position, which is manually controllable, said door positions are mutually exclusive in that if the first door is closing off the first outlet port, the second door must be closing off the third outlet port, thereby forcing water through the second outlet port and, if the second door is closing off the first outlet port, the first door must be closing off the second outlet port, thereby forcing water through the third outlet port and, if the first door is closing off the second outlet port and the second door is closing off the third outlet port, water will be forced through the first outlet port;

E. Control means to position said doors in an operative position;

F. Locking means to secure said control means once an operative position has been selected, said locking means prevent inadvertent repositioning of said control means;

G. A first conduit means, fixedly attached to said second outlet port and extending outwardly therefrom; and H. A second conduit means, fixedly attached to said third outlet port, extending outwardly therefrom.

2. The fire dump valve of claim 1 where the doors are further provided with angled baffles to reduce turbulence in the valve portion and quicken the flow through the conduit means.

* * * * *